(No Model.)
W. HASLUP.
VEHICLE WHEEL.
No. 397,078. Patented Jan. 29, 1889.
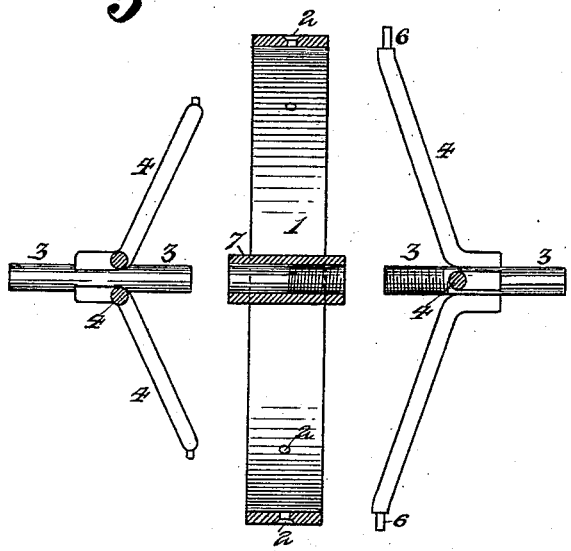
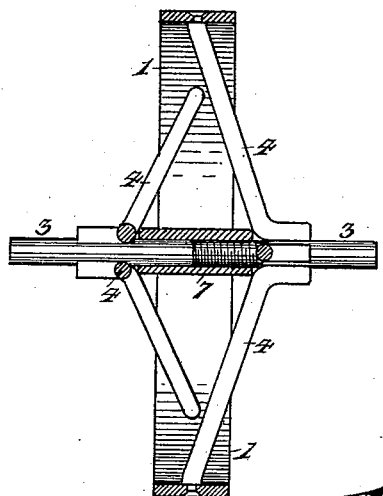
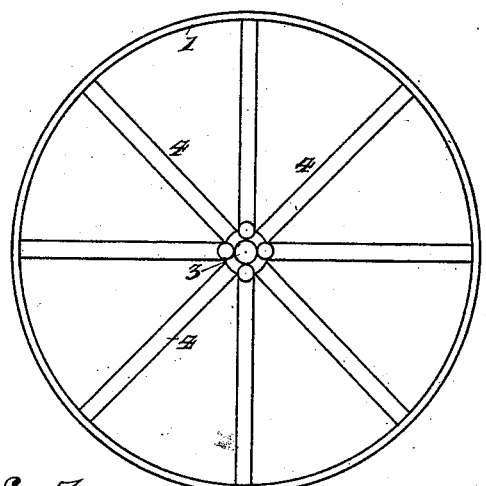
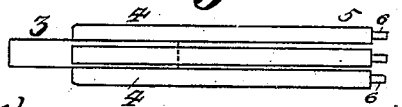
Attest
J. Watson Sime
Wm. F. Ross
Inventor
William Haslup
by Wood & Boyd
his Attorneys &c.

UNITED STATES PATENT OFFICE.

WILLIAM HASLUP, OF SIDNEY, ASSIGNOR OF ONE-HALF TO J. H. DOERING, OF WAPAKONETA, OHIO.

VEHICLE-WHEEL.

SPECIFICATION forming part of Letters Patent No. 397,078, dated January 29, 1889.

Application filed November 12, 1888. Serial No. 290,574. (No model.)

*To all whom it may concern:*

Be it known that I, WILLIAM HASLUP, a citizen of the United States, and a resident of Sidney, in the county of Shelby and State of Ohio, have invented certain new and useful Improvements in Vehicle-Wheels, of which the following is a specification.

This invention relates to that type of metallic wheels wherein the shaft or axle is made in two distinct parts, each formed with a series of spokes that are secured to the wheel-rim.

The objects of my invention are to improve such construction of wheel and provide novel means for securing the spokes to the wheel-rim and joining the shaft or axle sections between the spokes, to thereby obtain a more rigid structure than heretofore.

The objects of my invention I accomplish by the features of construction hereinafter described and claimed, reference being made to the accompanying drawings, in which—

Figure 1 is a sectional elevation of the parts in position ready to be connected together. Fig. 2 is a similar section showing the parts united. Fig. 3 is a side elevation of the wheel. Fig. 4 is a view of one of the sections of the wheel shaft or axle, showing the first step in the operation of constructing the same.

1 represents the rim of the wheel, which is first welded into the desired hoop form and provided with countersunk openings 2.

The wheel shaft or axle is composed of two sections, 3, each provided with a series of spokes, 4, that project from it from a point at or adjacent to the middle of its length, to provide an extension at each side of the spokes. The spokes are welded to the shaft or axle sections in the position represented by Fig. 4, and then the spokes are bent outwardly to the position shown by Fig. 1. The outer ends of the spokes have tenons 6 projecting from shoulders 5, and these tenons extend through the openings 2 at right angles to the axis of the wheel shaft or axle and are riveted down.

In order to make the wheel strong and prevent its springing and pulling the spokes out, the sections 3 of the shaft are sufficiently long on each side to come together and abut against each other when the parts are put together, which is the preferred form of construction. To prevent these parts from moving, as they are very liable to do under strain, and break the spokes, I provide a sleeve, 7, which is preferably threaded upon one of the sections, as shown in Figs. 1 and 2, and the parts are drawn firmly together or strained by the rotation of this sleeve. When the screw-threaded sleeve is moved, the wheel can be strained and the sections 3 of the shaft need not abut, as the sleeve forms a continuous section and prevents the lost motion of the two sections under strain. I have not shown the spokes connected by eyes and rivets to the rim, which is common in the construction of iron wheels, as they are liable to break off. This is especially the case when wheels are made of two sections, but without connection of the two sections of the shaft between the spokes; but by heading down the tenons and adjusting the sleeve 7 the lost motion is taken off the wheel, so that a much stronger and more durable, as well as cheap, metallic wheel is obtained.

It will be observed that the spokes are bent so that the shoulder 6 of the opposite spokes are as far apart as the inner periphery of the rim of the wheel. These spokes are sprung sufficient to allow the tenons to enter the mortises or openings 2, and the elasticity of the metal will cause them to recoil and abut against the rim. This is a very material improvement and makes the structure much more rigid with less strain upon the sleeve and shaft-sections 3. By making the wheel in this manner there is little liability of breaking the spokes.

Having described my invention, what I claim is—

1. A metallic wheel consisting of the wheel-rim, the wheel-shaft composed of two separate sections, each having a series of spokes welded thereupon and formed with tenons entering openings in the wheel-rim at right angles to the axis of the wheel-shaft, and the sleeve connecting the shaft-sections between the two sets of spokes, substantially as described.

2. A metallic wheel consisting of the wheel-rim, the wheel-shaft made of two separate sections, each provided with a series of spokes welded thereupon and secured to the wheel-rim, and the screw-sleeve connecting the shaft-sections between the two sets of spokes, substantially as described.

In testimony whereof I have hereunto set my hand.

WILLIAM HASLUP.

Witnesses:
D. OLDHAM,
J. D. FERREE.